March 21, 1961 T. R. SOWDER 2,975,728
SELF-ENERGIZING ROPE BRAKE FOR AERIAL TRAMWAYS
Filed Aug. 18, 1958
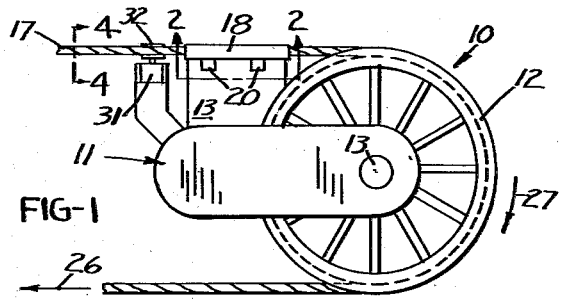
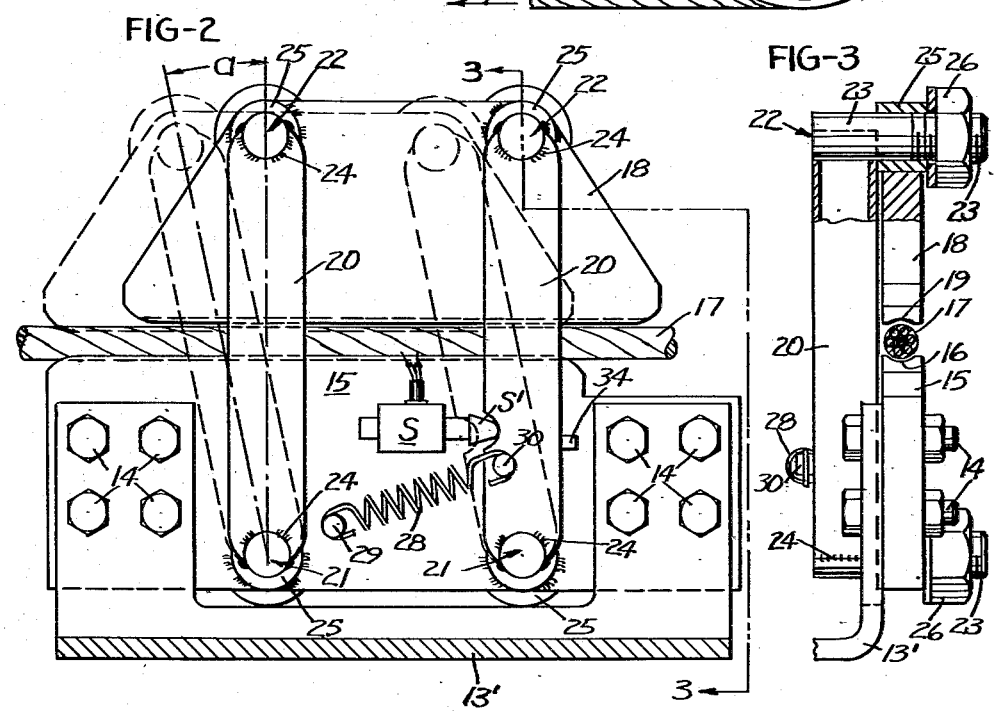
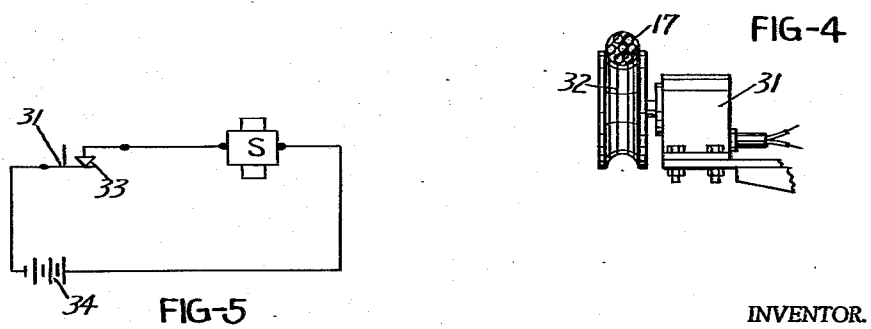
INVENTOR.
TONY R. SOWDER

2,975,728
SELF-ENERGIZING ROPE BRAKE FOR AERIAL TRAMWAYS

Tony R. Sowder, Spokane, Wash., assignor to Riblet Tramway Company, Spokane, Wash., a corporation of Washington Filed Aug. 18, 1958, Ser. No. 755,695

4 Claims. (Cl. 104—178)

The present invention is an aerial tramway and/or self-energizing brake therefor particularly adapted to operate upon the endless rope thereof.

In aerial tramways such as those used for transporting skiers to the upper limit of a ski area as well as those designed to carry material over great distances, it is customary to employ at least one endless wire rope which is trained about sheaves customarily disposed on a horizontal plane, the uppermost one of which is conventionally a traction sheave for driving the wire rope. Under these circumstances, the rope normally has a load flight and a return flight. With regard to a ski lift, the flight which extends from the lower pylon to the upper pylon and carries the skiers to the higher elevation is the load flight, while the opposite flight may be the load flight in a material handling tramway which, for instance, may be carrying ore from a mine on a relatively high elevation to a mill or loading dock at a lower elevation. Obviously when the greatest load is on one flight or the other of the cable, the normal reaction of gravity will endeavor to move the cable or wire rope to effect an equilibrium of the load weight at the lowermost point of the tramway.

Under present day practice, in some instances, it is customary to provide on the traction sheave of an aerial tramway a brake drum and cooperating brake shoe supported on the support pylon so that when the drive means for the drive sheave is de-energized, the brake may be applied to prevent back movement of the wire rope as occasioned by gravity. In other instances, brakes are applied at the source of power and yet in other instances the brake may be located in the area of the power transmission disposed between the source of power and the traction sheave.

To a degree, all of these have proven to be fairly satisfactory but are not in every case reliable. For instance, a brake when located at the source of power or in the power transmission area becomes ineffective if the mechanical connection between the final drive shaft and the traction sheave should fail. Obviously a brake at the source of power would be of no avail in the event of failure of the power transmission. It would appear that a brake on the traction sheave would overcome the undesirable features thus far suggested, but it will be at once apparent that there may even be a failure at this point should the tension of the cable or wire rope become such as to permit slippage of the cable over the traction sheave.

The present invention seeks to overcome all of these undesirable features by providing a self-energizing backstop brake which is specifically designed to operate directly upon the wire rope of an aerial tramway so that the braking action is applied directly to the element of the aerial tramway which it is desired to control.

Yet another object of the present invention lies in the provision of a backstop brake for the wire rope of an aerial tramway which is constructed to be self-energizing and is provided with control means for precluding the braking action under certain predetermined movement conditions of the wire rope, and yet one which will release the brake for its automatic self-energization when the movement conditions of the wire rope are otherwise than those certain predetermined conditions.

These and other objects and advantages of the present invention will become apparent during the course of the following description when considered in conjunction with the accompanying drawings wherein one preferred embodiment of the present invention is disclosed.

In the drawings, like numerals are employed to designate like parts throughout the several views, and:

Figure 1 is a top plan view of the drive sheave support pylon end of an aerial tramway;

Figure 2 is an enlarged vertical view taken substantially on the plane indicated by line 2—2 of Figure 1;

Figure 3 is a lateral vertical view taken substantially on the planes indicated by lines 3—3 of Figure 2;

Figure 4 is a lateral section taken on the plane indicated by line 4—4 of Figure 1; and Figure 5 is a wiring diagram.

Referring now more particularly to the drawing, the numeral 10 indicates an aerial tramway in its entirety, it being understood that the aerial tramway includes the traction sheave support pylon 11 at one end with a similar support pylon (not shown) at the opposed end and any number of desired intermediate support members (not shown) between the said pylons.

Pylon 11 supports the traction sheave 12 which is driven by the powered shaft 13 deriving its power from any suitable prime mover (not shown). Supported upon the traction sheave support pylon 11, I provide a bracket 13' to which is rigidly fixed, as by cooperating bolts and nuts 14, a stationary shoe 15 which has a friction groove 16 disposed adjacent to the wire rope 17 on the entry side of the traction sheave 12. It will be noted in Figure 3 that the friction groove 16 is arcuate to present a surface to substantially conform to the cylindrical configuration of the wire rope 17.

Opposed to said stationary shoe and disposed diametrically of said wire rope 17, I provide a second shoe 18 which has an arcuate friction groove 19 similar to that of the stationary shoe 15, while it is noted that the movable or second shoe is disposed in the same plane as the stationary shoe it also is movable toward and away from the stationary shoe to effect clamping action upon the wire rope 17 between the friction grooves 16 and 19 of the shoes.

A pair of links 20 have their lower ends pivotally associated at 21 with the stationary shoe 15. The upper ends of said links 20 are pivotally associated at 22 to the movable shoe 18. The pivotal connections are formed by bolts 23 rigidly secured to the links as by welding 24 and extend through bearing sleeves 25 carried by the shoes 15 and 18, and are confined therein against accidental displacement by means of cooperating nuts 26 threadedly associated with the threaded outer ends of the bolts 23.

It will thus be seen that the movable shoe 18 is supported for movement in a plane common to the shoes 15 and 18 toward and away from the stationary shoe 15 as shown in Figure 2 wherein the full line position shows the movable shoe 18 removed from the wire rope 17 out of clamping position and the broken line position discloses the shoe 18 frictionally engaged with the wire rope 17 and in clamping position.

With respect to Figures 1 and 2, the movement of the wire rope through the self-energizing backstop brake is from left to right on the entry side thereof to the traction sheave 12 as indicated by the arrow 26, with the traction sheave being driven in the direction indicated by the arrow 27. It will thus be seen that even though the movable brake 18 is resting frictionally upon the traction rope 17 as indicated by the broken line position of Figure 2, while the rope is moving from the left to the right therethrough, there will be no tendency to apply braking pressure to the rope since any frictional contact will tend to shift the movable brake shoe 18 from the broken line position toward the full line position. However, reverse movement of the traction rope 17 will tend to move the movable shoe 18 leftwardly, and because of the movement of links 20 through the angle $a$ will cause the shoe 18 to move toward the stationary shoe 15, thus clamping the rope therebetween and thus making the backstop brake one that is self-energizing.

To preclude the movable brake shoe 18 from dragging upon the wire rope 17, I provide a control means which is adapted to shift the brake shoe 18 out of contact with the wire rope 17 when there is no need for the braking action. This control means comprises a solenoid S whose armature S' operates upon one link 20 as particularly seen in Figure 2. When the solenoid is energized, the armature S' moves the link 20 to the full line position of Figure 2, wherein it impinges against the stop 34 carried by the stationary shoe 15, it being understood that the solenoid S has sufficient strength to overcome the tension of spring 28 which has one end fixed at 29 to the shoe 15 and the opposed end fixed at 30 to the link 20 to bias the shoe 18 toward the broken line position of Figure 2.

A sensing device 31 has a traction pulley 32 which is associated with the wire rope 17 and is driven thereby. The sensing device may be any one of a number of well known devices which are designed to actuate a switch 33 so that when the rotation of the pulley 32 is below a certain predetermined r.p.m., the switch 33 will open, and since the switch 33 is wired in series with the solenoid and a source of electrical energy such as battery 34, it will be noted that when the pulley 32 is being rotated at any speed above that predetermined r.p.m., the switch 33 will be closed and the solenoid S will be energized to shift the movable brake shoe 18 to the full line position. When, however, the travel of the wire rope 17 is decelerated to the extent that the rotation of the pulley 32 is below the predetermined r.p.m., the switch 33 will open, thus de-energizing the solenoid S and permitting the spring 28 to move the shoe 18 to the dotted line position, where it frictionally rubs on the rope 17. So long as the rope is continuing in the same direction, i.e., left to right (Figure 2), no appreciable braking action is effected. However, upon cessation of movement of the rope 17 in the aforesaid direction, an attempted movement in the reverse direction will cause the brake to automatically energize and rigidly clamp the wire rope 17 between the shoes 15 and 18, thus precluding any reverse movement beyond that minute amount required to effect self-energizing of the braking device.

It will thus be seen that I have provided a very efficient and effective self-energizing wire rope brake particularly adapted for use in aerial tramways.

Having thus described my invention, I desire to secure by Letters Patent of the United States the following:

1. The combination with an aerial tramway having a traveling traction rope of a fixed self-energizing backstop brake having cooperating clamping shoes disposed to clamp said rope; means operable to move said shoes into clamping engagement with said rope; and means responsive to predetermined rope velocity or travel direction changes controlling said first named means.

2. The combination with an aerial tramway having a support pylon; a traction sheave journaled for rotation on said pylon; and an endless traction rope having a portion trained about and carried by said sheave; of a backstop brake for said rope comprising a stationary shoe fixed relative to said pylon and having a friction surface disposed adjacent to said rope; a second shoe having a friction surface opposed to said first named friction surface diametrically of said rope; means supporting said second shoe for movements toward and away from said stationary shoe to alternately clamp and release said rope between said friction surfaces; and rope travel direction or velocity change sensing means for actuating said shoe supporting means.

3. The combination with an aerial tramway having a support pylon; a traction sheave journaled for rotation on said pylon; and an endless traction rope having a portion trained about and carried by said sheave; of a backstop brake for said rope comprising a pair of self-energizing friction shoes supported against substantial movement relative to said pylon and disposed to clamp said rope when energized; and rope travel direction or velocity change sensing means for moving said shoes away from each other when the rope is moving in one predetermined direction faster than a predetermined speed and effecting energizing movement toward each other when the rope movement conditions are otherwise.

4. An aerial tramway backstop brake comprising a pair of cooperating self-energizing rope clamping shoes; means for alternately precluding and effecting braking action of said shoes; and control means for automatically actuating said first named means in accordance with predetermined rope travel direction or velocity changes.

References Cited in the file of this patent

UNITED STATES PATENTS

| | | |
|---|---|---|
| 430,409 | Toomey | June 17, 1890 |
| 463,935 | Blackburn | Nov. 24, 1891 |
| 1,111,878 | Carroll | Sept. 29, 1914 |
| 1,317,291 | Heckman | Sept. 30, 1919 |
| 2,087,232 | Constam | July 20, 1927 |
| 2,811,228 | Borden | Oct. 29, 1950 |